United States Patent
Cho et al.

(10) Patent No.: US 10,027,885 B2
(45) Date of Patent: Jul. 17, 2018

(54) IMAGE MEASURING APPARATUS

(71) Applicant: MITUTOYO CORPORATION, Kanagawa (JP)

(72) Inventors: Gyokubu Cho, Kanagawa (JP); Akira Takada, Yokohama (JP); Takashi Hanamura, Kawasaki (JP); Takuho Maeda, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 294 days.

(21) Appl. No.: 14/797,485

(22) Filed: Jul. 13, 2015

(65) Prior Publication Data
US 2016/0021306 A1 Jan. 21, 2016

(30) Foreign Application Priority Data

Jul. 18, 2014 (JP) .................. 2014-148286

(51) Int. Cl.
*H04N 7/18* (2006.01)
*H04N 5/232* (2006.01)
*G06T 11/60* (2006.01)
*G01B 21/04* (2006.01)

(52) U.S. Cl.
CPC ......... *H04N 5/23229* (2013.01); *G01B 21/04* (2013.01); *G06T 11/60* (2013.01); *H04N 5/23293* (2013.01)

(58) Field of Classification Search
CPC .................................. G06K 9/00; H04N 7/18
USPC .................................................. 348/85–140
See application file for complete search history.

(56) References Cited

U.S. PATENT DOCUMENTS 6,816,609 B1 * 11/2004 Shimizu ............... G01B 11/024
  348/86
6,968,080 B2   11/2005 Takada et al.

FOREIGN PATENT DOCUMENTS

| JP | H 03-57403 B2 | 9/1991 |
| JP | 2001-59708 A  | 3/2001 |
| JP | 2001-319219 A | 11/2001 |
| JP | 2003-139520 A | 5/2003 |

OTHER PUBLICATIONS

U.S. Appl. No. 14/797,613 to Gyokubu Cho et al., which was filed Jul. 13, 2015.

* cited by examiner

*Primary Examiner* — Andy Rao
(74) *Attorney, Agent, or Firm* — Greenblum & Bernstein, P.L.C.

(57) ABSTRACT

An image measuring apparatus is configured such that an image of a measured object placed on a stage is captured by a camera, the captured image is displayed on, a captured image display screen, and determination results based on results of a measurement are displayed in an overview list separately from the captured image of the measured object. The image measuring apparatus includes an individual determination results display region displaying individual determination results for each measurement position; and an overall determination results display region displaying overall determination results for the measured object as a unit. The image measuring apparatus is configured to display the individual determination results and the overall determination results together.

14 Claims, 11 Drawing Sheets

IMAGE MEASURING APPARATUS

CROSS-REFERENCE TO RELATED APPLICATIONS

The present application claims priority under 35 U.S.C. § 119 of Japanese Application No. 2014-148286, filed on Jul. 18, 2014, the disclosure of which is expressly incorporated by reference herein in its entirety.

BACKGROUND OF THE INVENTION

1. Field of the Invention

The present disclosure relates to an image measuring apparatus, and in particular to an image measuring apparatus favorably used in an image measuring device, a quantitative microscope having an installed imaging unit, or the like. The image measuring apparatus is configured such that an image of a measured object placed on a stage is captured by a camera, the captured image is displayed on a captured image display screen, and determination results based on results of a measurement are displayed in an overview list separately from the captured image of the measured object.

2. Description of Related Art

A typical image measuring device, such as those described in Japanese Patent Publication No. H03-57403 and Japanese Patent Laid-open Publication No. 2003-139520, includes a parts program capable of recording a measurement procedure that has been performed once and, when measuring a measured object (also referred to as a work piece) having an identical shape, is capable of automatically recreating the recorded measurement procedure. In addition, as described in Japanese Patent Laid-open Publication No. 2001-319219, the image measuring apparatus includes tolerance comparison in which, after a measured object has been measured, measured values are compared against design values to determine whether the measured values are within a predetermined tolerance. Typically, in a case where continuous measurement of a plurality of work pieces having identical shapes is performed by the image measuring device using the parts program, an operator executes the parts program for each work piece and verifies the output tolerance determination results to determine quality of the work piece.

Display of the determination results of the tolerance comparison ("OK" or "NG" (fail)) is performed by presenting notations for the measured values and design values in a measurement results display region, as shown in FIG. 1, for example. However, the tolerance determination results are difficult to grasp with this display and so, as described in Japanese Patent Laid-open Publication No. 2001-59708, an overview display is provided in which the determination results are given in a list, separately from an image of the measured object.

The determination results of the tolerance comparison are typically displayed with letters such as "OK" and "NG" together with the measurement results, as shown in FIG. 1. The operator therefore has difficulty in intuitively understanding whether the measurement results approximate the design value or are on the edge of the tolerance range, whether the measurement results are larger or smaller than the design value, and the like.

In addition, in a case where continuous measurement of work pieces having identical shapes is performed by a conventional image measuring system, in order to verify a shift in the measurement results, interpretation of each measurement result must be performed separately using a statistical/analytical function installed in the image measuring system or an external program having a statistical/analytical function, making it difficult for the operator to verify a shift in the measurement results in real time.

Accordingly, the operator has difficulty verifying deviations and variations in the shape of a work piece. For example, even though a tool processing a work piece experiences wear and the like and processing accuracy of work pieces degrades over time, an operator performing measurement has difficulty noticing such degradation and is unable to detect the degradation until the tolerance determination results return an "NG."

SUMMARY OF THE INVENTION

The present disclosure has been conceived in order to resolve the conventional circumstances described above, and therefore is configured to enable an operator to be intuitively and comprehensibly notified of details of determination results and of a shift in measurement results during, for example, continuous measurement of measured objects having identical shapes using a parts program.

The present disclosure addresses the above circumstances with an image measuring apparatus configured such that an image of a measured object placed on a stage is captured by a camera, the captured image is displayed on a captured image display screen, and determination results based on results of a measurement are displayed in an overview list separately from the captured image of the measured object. As shown in FIG. 2, the image measuring apparatus includes an individual determination results display region displaying individual determination results for each measurement position; and an overall determination results display region displaying overall determination results for the measured object as a unit. The image measuring apparatus is configured to display the individual determination results and the overall determination results together.

Herein, a position of a measured value relative to a determination range can be displayed in analog in the overall determination results display region.

In addition, an increase/decrease direction of a present measured value relative to a previous measured value can be displayed in proximity to the overall determination results display region.

In addition, a trend graph illustrating shifts in the measured value can also be displayed in the background of the overall determination results display region.

In addition, the trend graph can be displayed together with the determination range in the background of the overall determination results display region.

In addition, at least a number of NGs can be displayed numerically in the overall determination results display region.

According to the present disclosure, an operator can be intuitively and comprehensibly notified of details of determination results and of a shift in measurement results during, for example, continuous measurement of measured objects having identical shapes using a parts program.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described in detail with reference to the drawings. Moreover, the present invention is not limited by the content described in the embodiments and examples that follow. Configuration requirements in the following embodiments and examples may also include that which is readily conceivable by one skilled in the art, that which is substantially similar, and that which encompasses an equivalent scope. Furthermore, the configuration requirements disclosed in the following embodiments and examples may be combined as appropriate, or may be selectively employed as appropriate.

Figure 3:
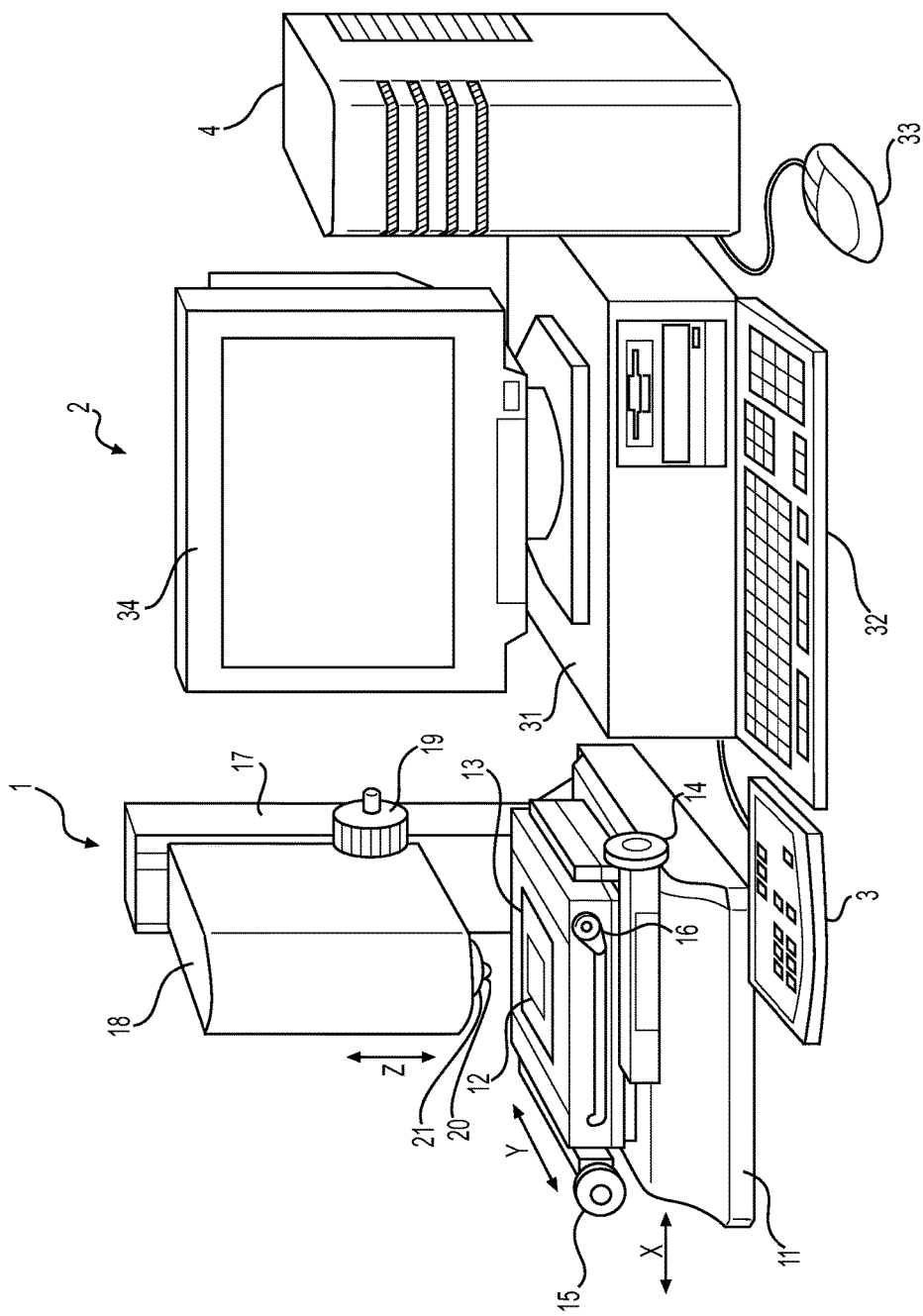
FIG. 3 is a perspective view of an exemplary overall configuration of an image measuring device to which the present disclosure is applied.

FIG. 3 illustrates an overall configuration of a manually operated image measuring device to which the present disclosure is applied. The image measuring device is configured by a measuring device main body 1 of a non-contact image measuring type; a computer system 2 executing a process assisting in a stage displacement operation of the measuring device main body 1, and executing required measurement data processing; a command inputter 3 giving a necessary measurement command and measurement parameters to the measuring device main body 1; a keyboard 32; a mouse 33; and a power station 4 supplying stable electric power to the various components.

The measuring device main body 1 includes a table 11 and a stage 13 mounted above the table 11. A work piece 12 (measured object) may be placed on the stage 13. An X axis drive shaft 14 and a Y axis drive shaft 15 drive the stage 13 in an X axis direction and a Y axis direction, respectively. An upwardly-extending frame 17 is fixated to a back end portion of the table 11. A camera unit 18 is supported on the frame 17. The camera unit 18 is capable of being displaced by a Z axis drive shaft 19 in a Z axis direction along a guide rail formed on the frame 17. A camera (for example, a CCD camera) 20 is mounted in an interior of the camera unit 18 so as to capture an image of the stage 13 from above. A ring-shaped illumination device 21 illuminating the work piece 12 is provided proximate to a bottom end of the camera 20.

Figure 4:
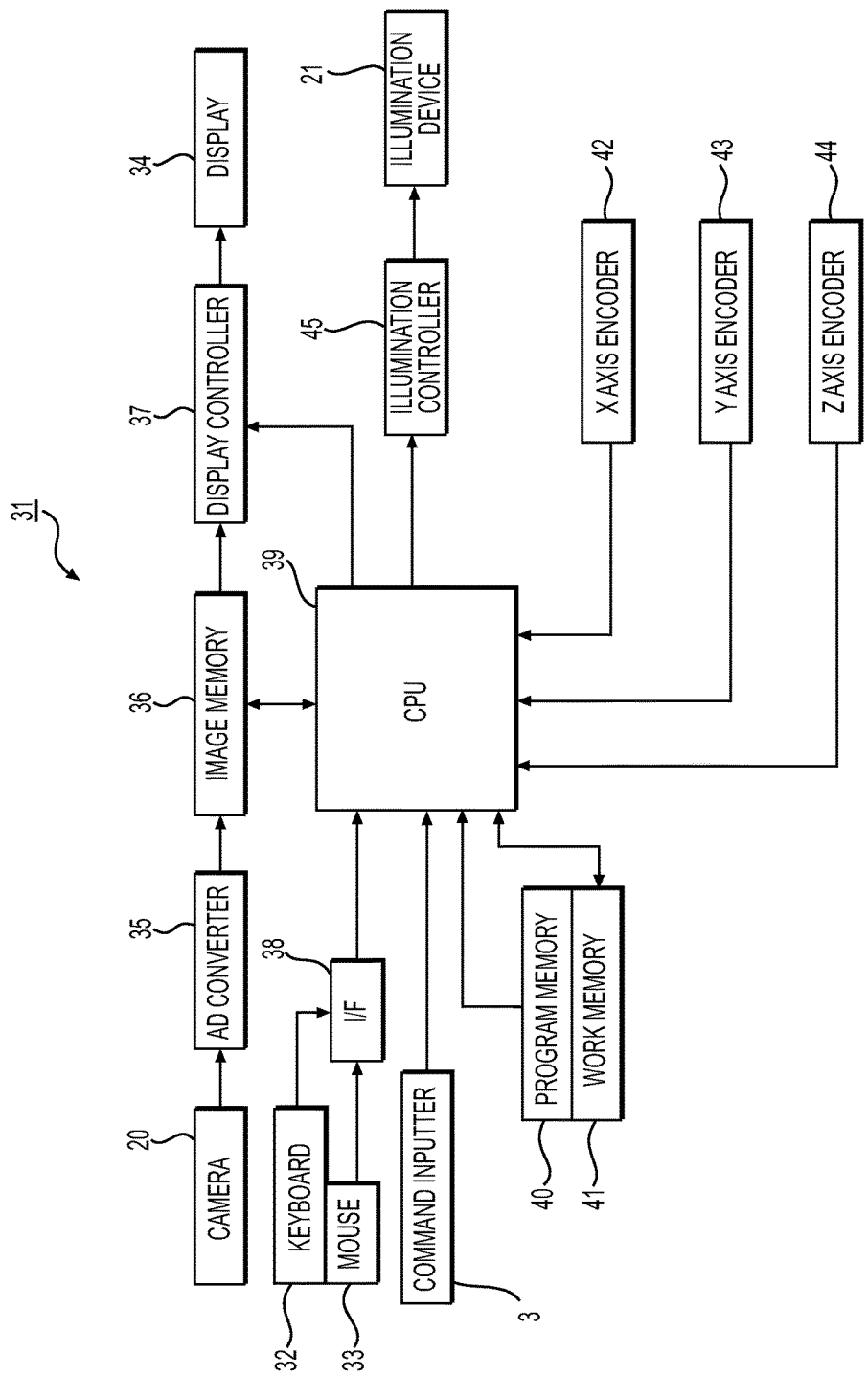
FIG. 4 is a block diagram illustrating a configuration of a computer system in the image measuring device.

The computer system 2 is configured to include a computer main body 31, the keyboard 32, the mouse 33, and a display screen (for example, a liquid crystal display screen or a CRT display screen) 34. This system, which is based around the computer main body 31, may be configured as shown in FIG. 4, for example. An image signal for an image of the work piece 12 captured by the camera 20 is converted into digital image data by an AD converter 35 and is stored in an image memory 36. The digital image data stored in the image memory 36 is displayed on the display screen 34 due to operations by a display controller 37. An operator's command input using the keyboard 32 and mouse 33 is transmitted to a CPU 39 via an interface (I/F) 38. The CPU 39 executes a measurement process according to the operator's command or a parts program stored in a program memory 40. A working memory 41 provides a work space for various processes of the CPU 39.

In order to detect each of the X, Y, and Z axis direction positions of the camera 20 relative to the stage 13, an X axis encoder 42, a Y axis encoder 43, and a Z axis encoder 44 are also provided. Output from these encoders 42 to 44 is taken into the CPU 39. Based on a command value generated by the CPU 39, an illumination controller 45 generates an analog quantity command voltage and drives the illumination device 21.

Hereafter, the embodiments are described in detail.

Figure 5:
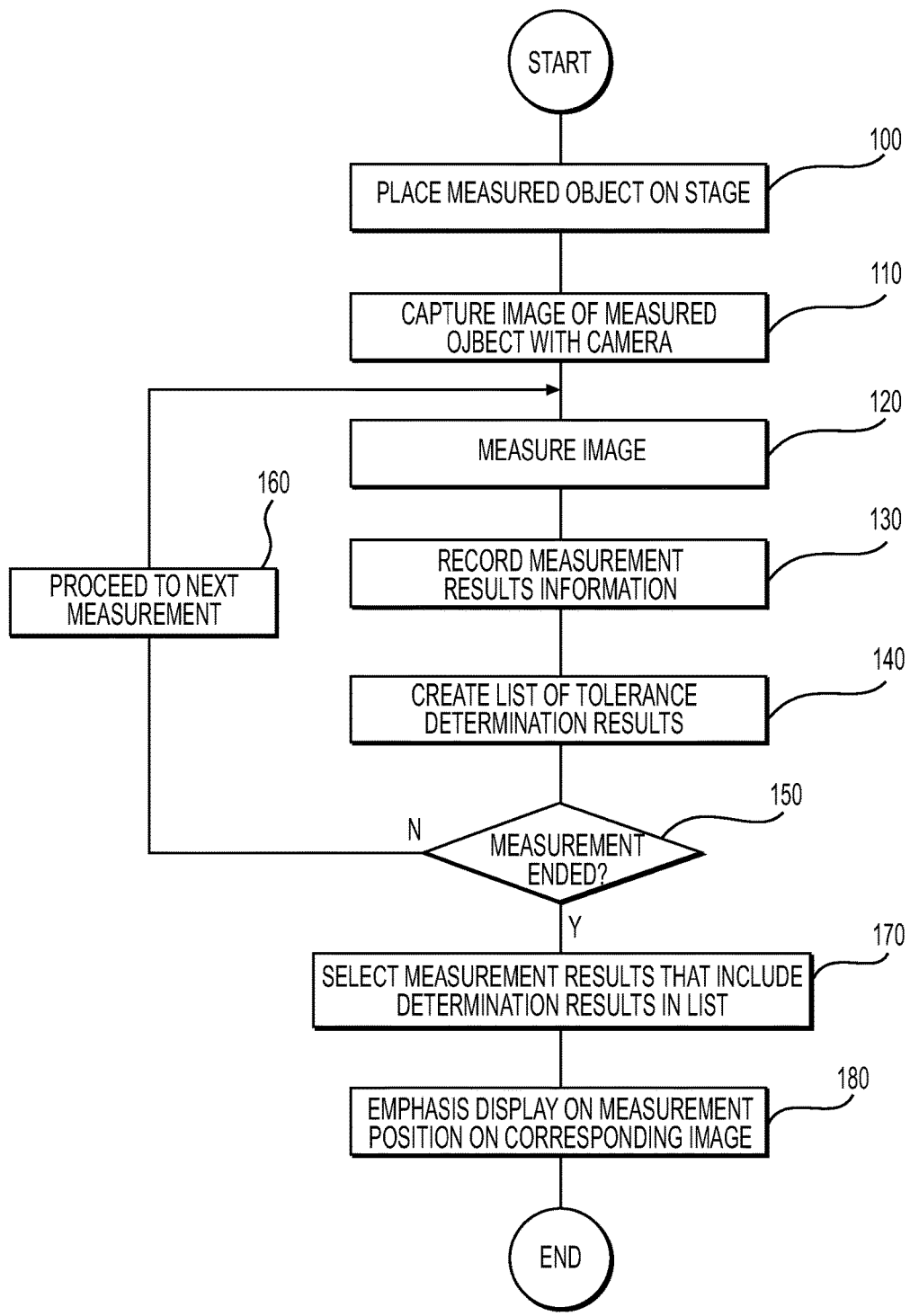
FIG. 5 is a flowchart illustrating a procedural flow according to a first embodiment of the present disclosure.
Figure 6:
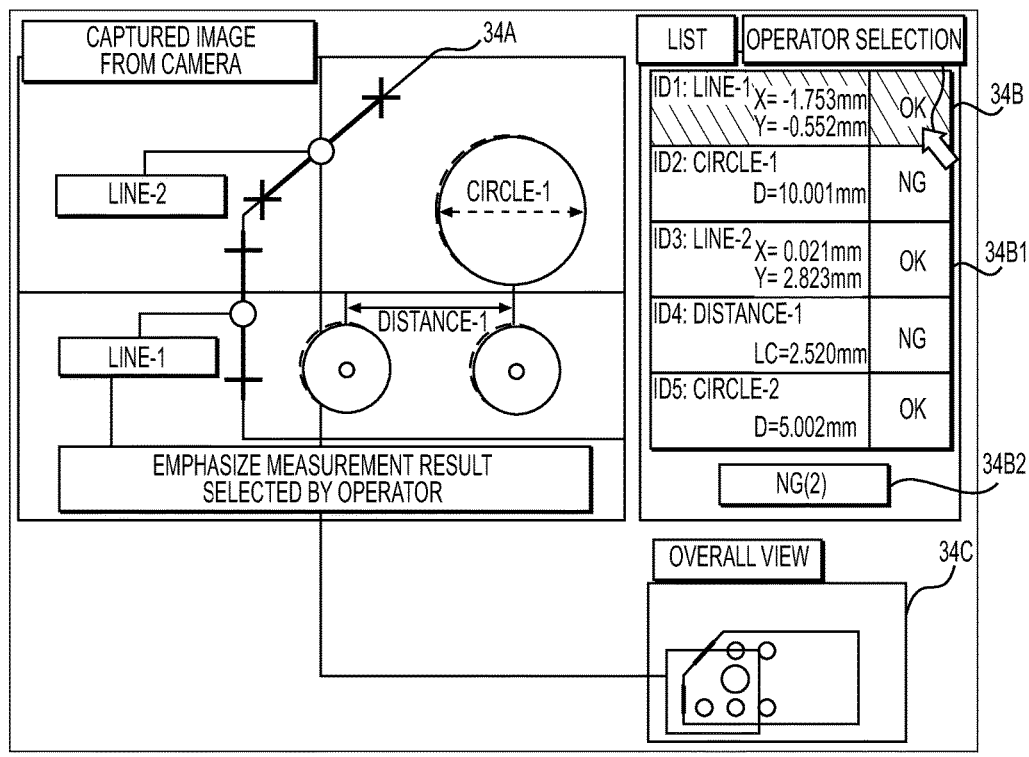
FIG. 6 illustrates an exemplary display on a display screen according to the first embodiment.

FIG. 5 illustrates a procedural flow, while FIG. 6 illustrates an exemplary display on the display screen 34 according to a first embodiment of the present disclosure. In the first embodiment, when a determination result is selected from a list, an emphasis display is provided to a corresponding measurement position on a captured image display screen.

In the first embodiment, first, in step 100, a measured object (work piece 12) is placed on the stage 13 of the measuring device main body 1.

Next, in step 110, an image of the work piece 12 is captured by the camera 20 mounted to the measuring device main body 1.

Next, in step 120, a desired element and edge detection tool are selected on a captured image display screen 34A displaying the captured image (enlarged image of the work piece 12) from the camera 20, shown on a top left side of FIG. 6, and measurement is performed.

Information for measurement results including tolerance determination results is recorded each time measurement is performed (step 130), and a tolerance determination results list 34B is created that an operator can understand at any time (step 140).

Until a determination is made in step 150 that measurement has ended, the process advances to the next measurement position in step 160 and repeats steps 120 through 140.

The tolerance determination results can be displayed with different colors, such as OK being green and fail (NG) being red.

After a determination is made in step 150 that measurement has ended, when an operator selects, in step 170, measurement results (topmost ID1 in FIG. 6) that include the desired determination results, which are displayed in the tolerance determination results list 34B that has been created, a corresponding measurement position (Line-1 in FIG. 6) displayed on the captured image display screen 34A is provided with an emphasis display such as highlighting in step 180.

Accordingly, even in a case where a plurality of measurement results are displayed on one screen (FIG. 6 shows five in addition to ID1: ID2: Circle-1, ID3: Line-2, ID4: Distance-1, and ID5: Circle-2) and selection of the designated measurement results (here, ID1) within the captured image display screen 34A is difficult, by selecting measurement results that include the tolerance determination results that were converted into a list, the operator can easily discover the measurement position on the captured image display screen 34A corresponding to the measurement results in the list 34B and a mistaken selection of measurement results by the operator can be prevented from occurring.

Figure 1:
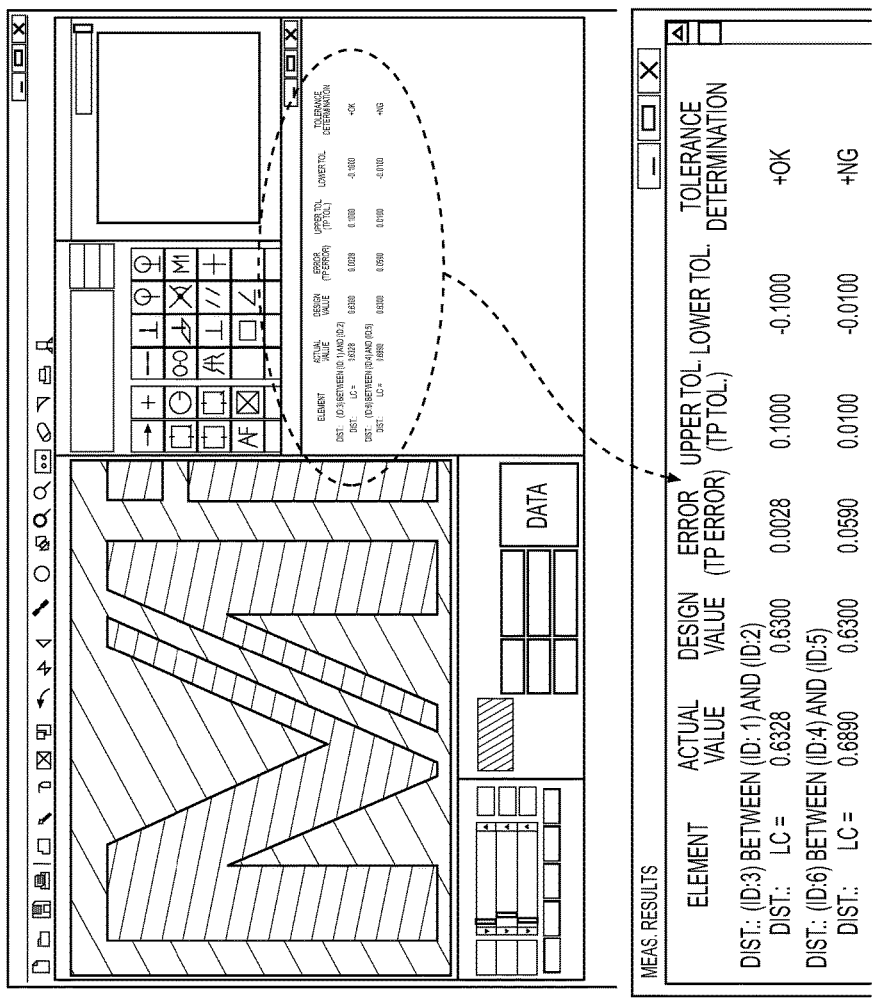
FIG. 1 illustrates a conventional display of tolerance determination results in an image measuring device.
Figure 2:
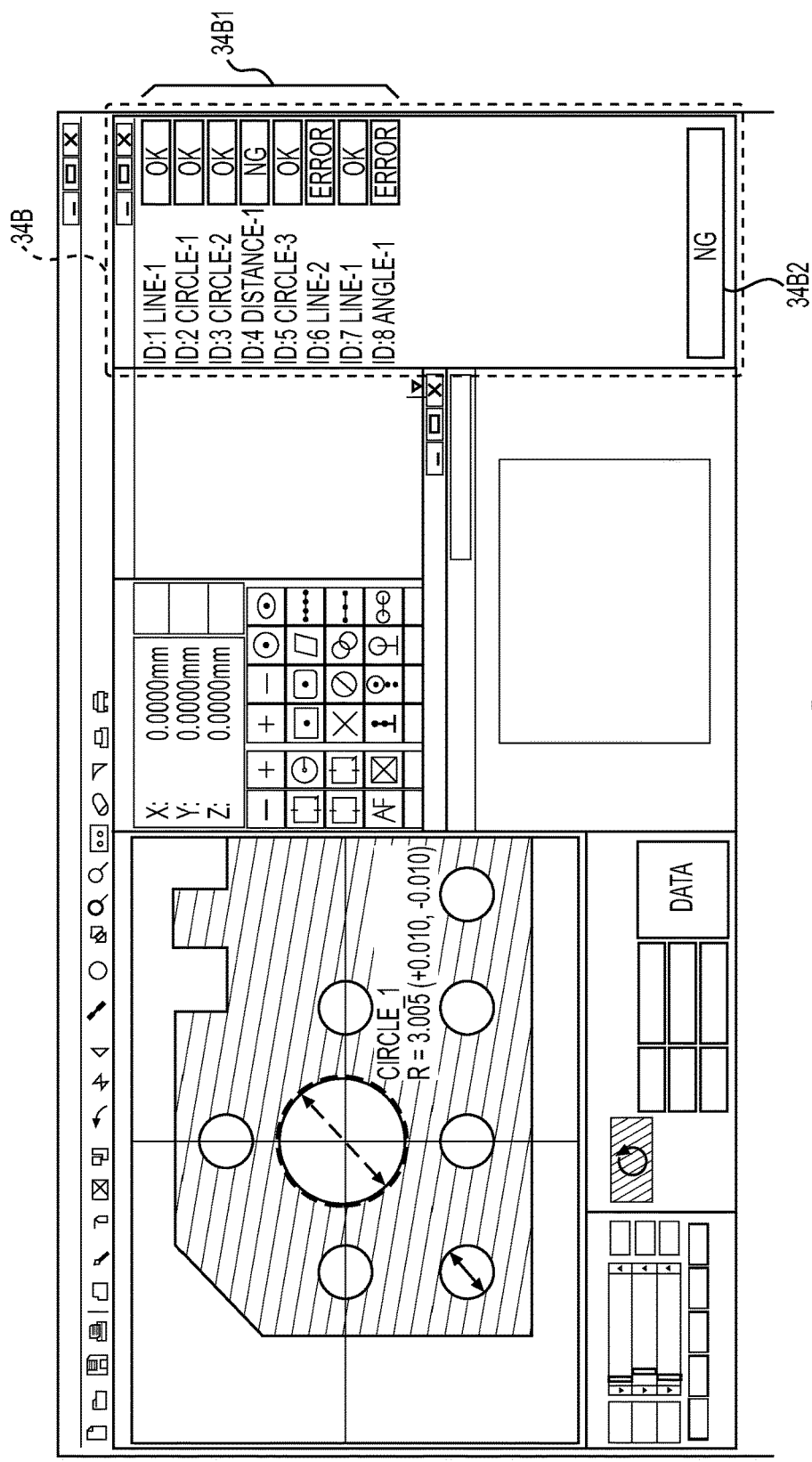
FIG. 2 illustrates an exemplary display of tolerance determination results according to the present disclosure.

In the first embodiment of the present disclosure, the list 34B shown in FIG. 2 is configured by an individual determination results display region 34B1 which provides details of the tolerance determination results for each measurement position; and an overall determination results display region 34B2 which provides overall determination results for the work piece 12 as a unit. In addition, the present embodiment is configured to display not only the individual determination results but also the overall determination results ("NG" in the drawings), and therefore the operator can discover the overall determination results extremely easily.

In the present embodiment, a number of NGs is also displayed in parentheses in the overall determination results display region 34B2, and therefore the operator can discover an extent of the NGs, as well.

Figure 7:
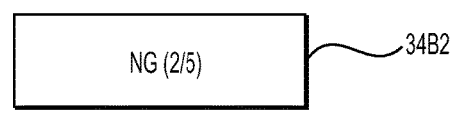
FIG. 7 illustrates an exemplary display of overall determination results according to a second embodiment of the present disclosure.

Moreover, as in a second embodiment of the present disclosure shown in FIG. 7, a total number of measurement results (five in this example) is set as a denominator and the number of NGs (two in this example) is shown as a numerator, enabling a ratio of the number of NGs to the total number of measurement results to be understood.

Furthermore, in the present embodiment, in addition to the captured image 34A from the camera 20 and the list 34B, a measured object overall view 34C showing the entire measured object is also displayed. Therefore, a position of the captured image (34A) relative to the entire measured object can be readily discovered. The measured object overall view 34C may also be omitted.

Figure 8:
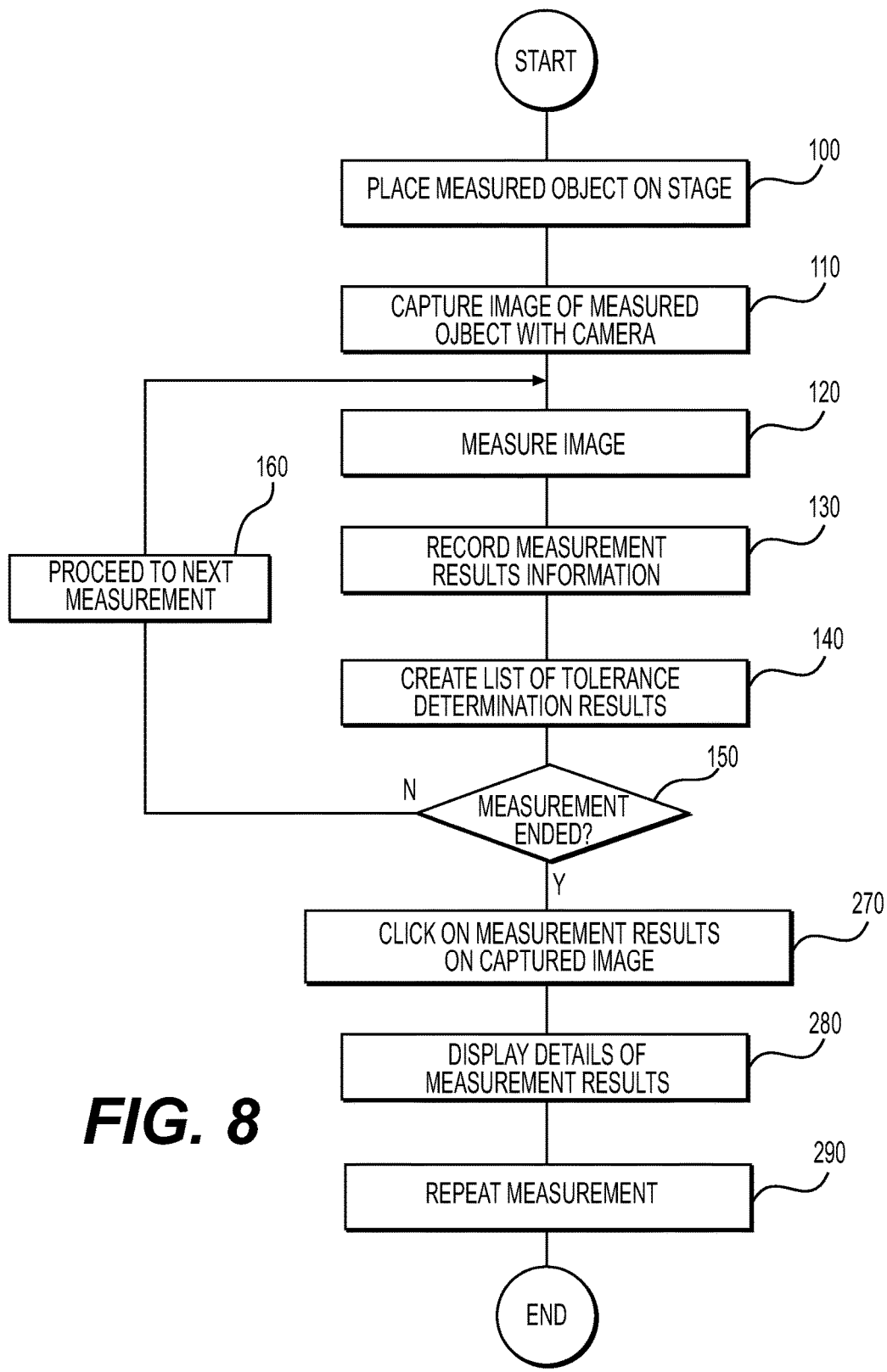
FIG. 8 is a flowchart illustrating a procedural flow according to the second embodiment.

Next, a detailed description is given of the second embodiment, which facilitates remeasuring when selecting measurement results. A procedural flow according to the second embodiment is shown in FIG. 8, while an exemplary display on the display screen 34 is shown in FIG. 9.

Figure 9:
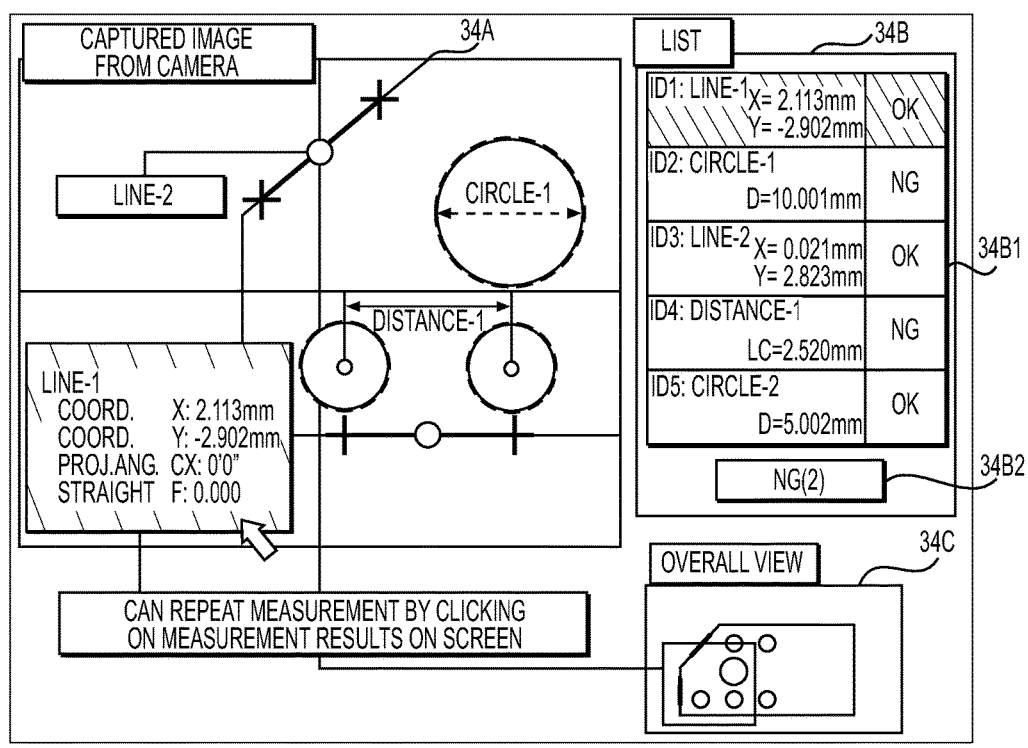
FIG. 9 illustrates an exemplary display on a display screen according to the second embodiment.

After steps 100 to 150 are performed as in FIG. 5 and measurement ends, when the operator clicks on the measurement results (Line-1 in FIG. 9) displayed on the captured image display screen 34A in step 270, details of the measurement results (in this example, X and Y coordinates, projection angle, straightness) are displayed in step 280, as shown in FIG. 9. While the measurement results are displayed, measurement is repeated by clicking on the detailed display (step 290). When repeating the measurement, editing of a detection position of the detection tool used during measurement (re-entering design values that were manually entered when beginning measurement) is enabled, as well as editing of design values for the tolerance determination results and upper limit/lower limit values, making it possible to update the measurement results.

According to the present embodiment, measurement can be repeated simply by clicking on the measurement results displayed on the captured image display screen 34A, and work efficiency can be increased.

Moreover, instead of the measurement results displayed on the captured image display screen 34A, the operator can also select measurement results and determination results displayed in the individual determination results display region 34B1 of the list 34B and repeat measurement.

Figure 10:
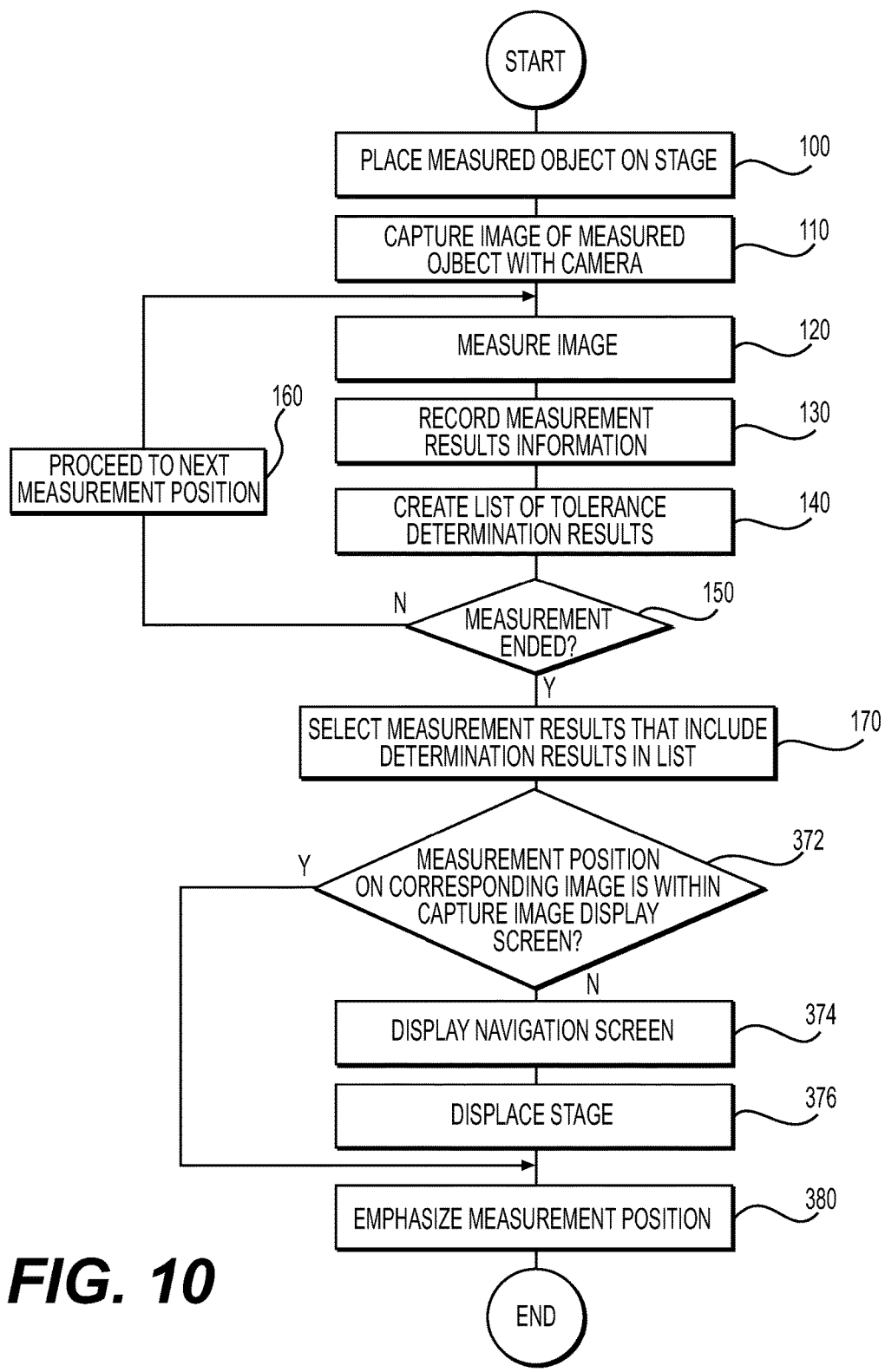
FIG. 10 is a flowchart illustrating a procedural flow according to a third embodiment of the present disclosure.

Next, a detailed description is provided for a third embodiment of the present disclosure, in which the measurement results and a stage position are linked, enabling stage displacement navigation in a case where the measurement position is not located in the captured image display screen 34A currently (i.e., presently) displayed. A procedural flow according to the third embodiment is shown in FIG. 10, while an exemplary display on the display screen 34 is shown in FIG. 11.

After the same step 170 as in the first embodiment ends, the process advances to step 372 and a determination is made as to whether the designated (selected) measurement results (ID5 in this example) are located within a present display screen of the captured image 34A. When the determination result is negative, the process advances to step 374 and a stage displacement navigation screen (here, an X axis direction and Y axis direction displacement distance toward ID5) is displayed on the screen, prompting stage displacement (step 376). Moreover, information for the remaining distance can be updated to align with the stage displacement.

Figure 11:
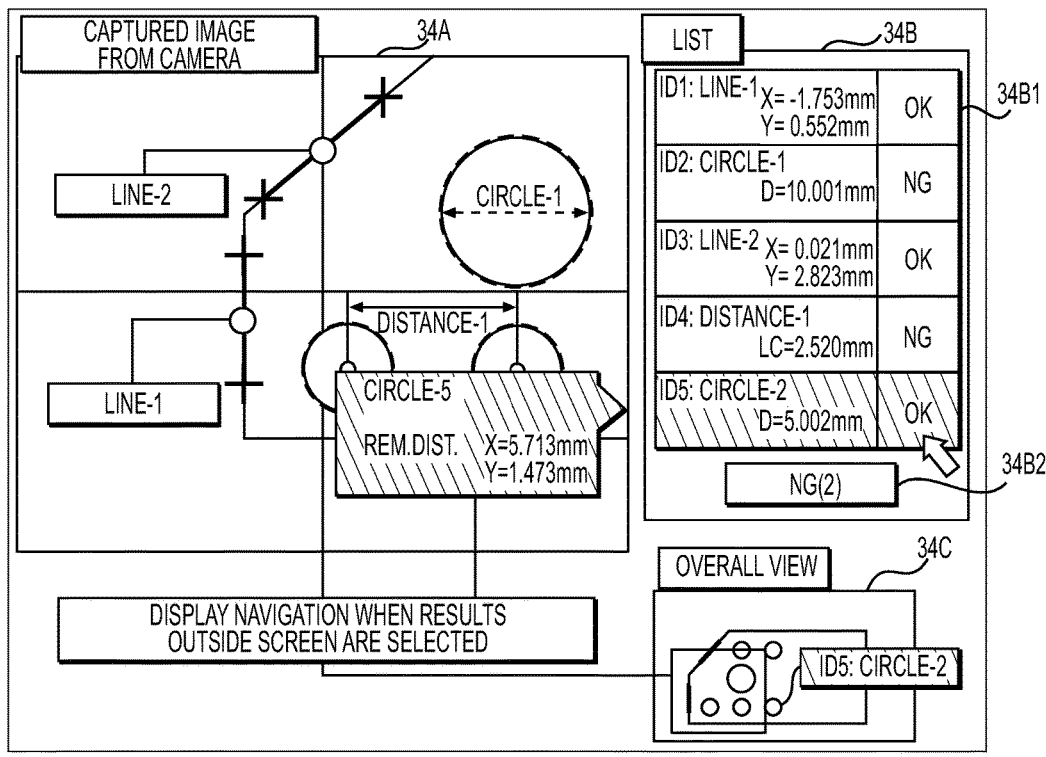
FIG. 11 illustrates an exemplary display on a display screen according to the third embodiment.

The navigation is capable not only of displaying the remaining distance with a numerical value, as shown in FIG. 11, but is also able to present an intersection point of cross hair lines such that the intersection point displaces to be at the center of the captured image display screen 34A, for example, or to directly display a displacement direction with an arrow or the like. In addition, in the case of an automatically controlled image measuring device such as a CNC, the stage displacement of step 376 can be performed automatically.

When a determination is made in step 372 as to whether, due to the stage displacement because the designated (selected) measurement results were not displayed on the presently displayed screen in step 372, the designated (selected) measurement results are now displayed within the presently displayed screen or a determination is made that the designated (selected) measurement results are already displayed within the presently displayed screen, the process advances to step 380 and an emphasis display such as highlighting is placed on the measurement results displayed on the screen.

According to the present embodiment, by designating (selecting) measurement results that include the determination results on the list, navigation is performed for displacement toward the corresponding measurement position, and therefore work efficiency can be improved.

Figure 12A:
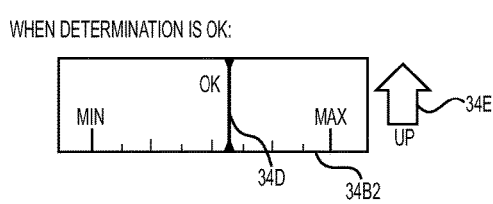
FIGS. 12A and 12B illustrate exemplary displays of overall determination results according to the third embodiment of the present disclosure.
Figure 12B:
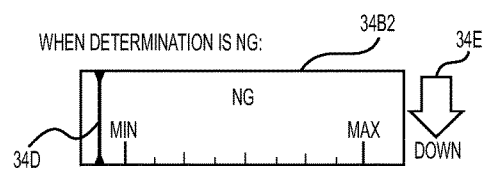

Moreover, in the present embodiment, the overall determination results are displayed in the overall determination results display region 34B2 using any of color differentiation, the letters "OK" and "NG," and the number of NGs. However, as in the third embodiment of the present disclosure shown in FIGS. 12A (for OK) and 12B (for NG), a position of a measured value relative to a tolerance range of MIN to MAX can also be displayed within the overall determination results display region 34B2 in a meter shape, using an indicator needle 34D formed by a vertical line that moves left and right, as in the illustrated example. Thereby, the operator can intuitively understand details of the tolerance determination results, i.e., whether the measurement results approximate the design value or are on the edge of the tolerance range, whether the measurement results are larger or smaller than the design value, and the like.

Furthermore, the measurement results can also be displayed together with an arrow symbol 34E indicating an increase/decrease direction of a value for the present measurement results relative to the previous measurement results. As a result, the operator can verify, in real time, a shift in the measurement results.

Figure 13A:
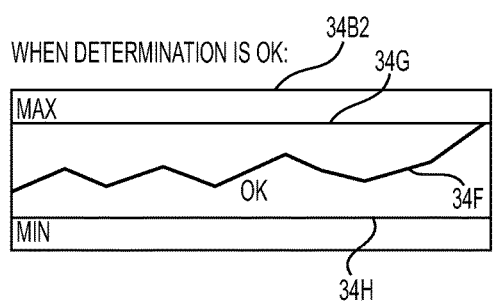
FIGS. 13A and 13B illustrate exemplary displays of overall determination results according to a fourth embodiment of the present disclosure.
Figure 13B:
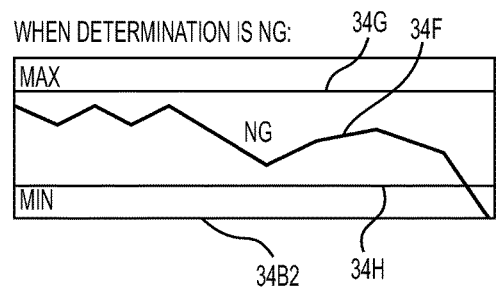

Alternatively, as in a fourth embodiment of the present disclosure shown in FIGS. 13A (for OK) and 13B (for NG), a trend graph 34F illustrating shifts in the measurement results can also be displayed in the background of the overall determination results display region 34B2. In such a case, when displayed together with boundaries for a maximum value MAX and a minimum value MIN (upper limit value 34G, lower limit value 34H), as shown in the drawings, the operator can readily grasp not only a trend, but also a relationship relative to the upper limit value and lower limit value. The trend graph 34F may also be used alone.

Figure 14A:
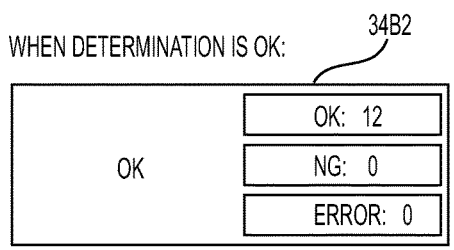
FIGS. 14A and 14B illustrate exemplary displays of overall determination results according to a fifth embodiment of the present disclosure.
Figure 14B:
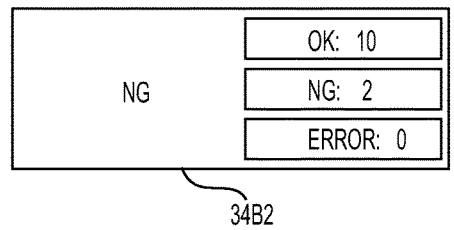

In addition, as in a fifth embodiment of the present disclosure shown in FIGS. 14A (for OK) and 14B (for NG), a number of OKs, a number of NGs, and a number of measurement errors can also be displayed together in the overall determination results display region 34B2. Moreover, in a case where the overall determination results return an OK only when all of the individual determination results are OK, a right side display may be omitted to enhance visibility in the case of an OK result, as shown in FIG. 14A. The error display may also be omitted. Moreover, in a case where the error may be ignored, displaying the number of errors is unnecessary.

In each of the above-described embodiments, the individual determination results and overall determination results are displayed in the list 34B, facilitating comparison and contrasting of the two sets of results. In addition, the individual determination results and overall determination results can also be displayed in separate windows.

Furthermore, in each of the above-described embodiment, tolerance determination results are displayed in the list 34B; however, the determination results displayed in the list are not limited to this. The display position of the list 34B is also not limited to that of the above-described embodiments, and the list 34B can instead be displayed in a corner of the captured image display screen 34A, for example.

The present invention is not limited to being applied to an image measuring device, and can also be applied to a quantitative microscope having an installed imaging unit, for example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image measuring apparatus configured such that an image of a measured object placed on a stage is captured by a camera, the image measuring apparatus comprising:
    a captured image display region of a screen and configured to display the captured image, wherein determination results based on results of a measurement are displayed on the screen in an overview list separately from the captured image of the measured object;
    an individual determination results display region of the screen and configured to display individual determination results for each measurement position; and
    an overall determination results display region of the screen and configured to display overall determination results for the measured object as a unit indicating the success or failure of the measurement, wherein:
    the captured image, the individual determination results and the overall determination results are displayed on the screen together; and
    when a said individual determination result has been selected by an operator, a corresponding measurement position is emphasized on the captured image in the captured image display region.

2. The image measuring apparatus according to claim 1, wherein a position of a measured value relative to a determination range is displayed in analog in the overall determination results display region.

3. The image measuring apparatus according to claim 1, wherein an increase/decrease direction of a present measured value relative to a previous measured value is displayed proximate to the overall determination results display region.

4. The image measuring apparatus according to claim 1, wherein a trend graph illustrating shifts in a measured value is displayed in a background of the overall determination results display region.

5. The image measuring apparatus according to claim 4, wherein the trend graph is displayed together with a determination range in the background of the overall determination results display region.

6. The image measuring apparatus according to claim 1, wherein at least a number of overall determination results is displayed numerically in the overall determination results display region.

7. The image measuring apparatus according to claim 2, wherein an increase/decrease direction of a present measured value relative to a previous measured value is displayed proximate to the overall determination results display region.

8. A method of displaying measurement results on a display of an image measuring apparatus, the method comprising:

displaying, in a captured image display region of a screen, an image of a measured object placed on a stage and captured by a camera;

displaying on the screen, determination results based on results of a measurement in an overview list, separately from the captured image of the measured object;

displaying, in an individual determination results display region of the display, individual determination results for each measurement position;

displaying, in an overall determination results display region of the display, overall determination results for the measured object as a unit indicating the success or failure of the measurement, wherein the displaying the captured image, the displaying individual determination results and the displaying overall determination results occur together emphasizing, when a said individual determination result has been selected by an operator, a corresponding measurement position on the captured image in the captured image display region.

9. The method according to claim 8, further comprising displaying in analog, a position of a measured value relative to a determination range, in the overall determination results display region.

10. The method according to claim 8, further comprising displaying an increase/decrease direction of a present measured value relative to a previous measured value proximate to the overall determination results display region.

11. The method according to claim 8, further comprising displaying a trend graph illustrating shifts in a measured value in a background of the overall determination results display region.

12. The method according to claim 11, wherein the trend graph displaying comprises displaying the trend graph together with a determination range in the background of the overall determination results display region.

13. The method according to claim 8, further comprising numerically displaying at least a number of overall determination results in the overall determination results display region.

14. The method according to claim 9, further comprising displaying an increase/decrease direction of a present measured value relative to a previous measured value proximate to the overall determination results display region.

* * * * *